US011567705B2

(12) United States Patent
Morimoto (10) Patent No.: US 11,567,705 B2
(45) Date of Patent: Jan. 31, 2023

(54) SHEET FEEDING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yasushi Morimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/783,948

(22) Filed: Feb. 6, 2020

(65) Prior Publication Data

US 2020/0264814 A1    Aug. 20, 2020

(30) Foreign Application Priority Data

Feb. 14, 2019  (JP) .............................. JP2019-024689

(51) Int. Cl.
G06F 3/12        (2006.01)
G06K 15/16    (2006.01)
H04N 1/23      (2006.01)

(52) U.S. Cl.
CPC .......... *G06F 3/1204* (2013.01); *G06F 3/1256* (2013.01); *G06F 3/1273* (2013.01); *G06K 15/16* (2013.01)

(58) Field of Classification Search
CPC .......... B41J 11/009; B41J 11/485; B41J 3/46; G06F 3/1204; G06F 3/1256;
(Continued)

(56) References Cited

U.S. PATENT DOCUMENTS 10,002,373 B1 *   6/2018   Voskamp ........... G06Q 30/0601
2002/0134670 A1 * 9/2002   Echizen .............. C23C 14/0042
                                                               204/192.13
(Continued)

FOREIGN PATENT DOCUMENTS

JP    09-297437 A      11/1997
JP    09297437 A    *  11/1997
(Continued)

OTHER PUBLICATIONS

Extended European Search Report dated Jul. 9, 2020, in European Patent Application No. 20154948.2.

*Primary Examiner* — Chad Dickerson
(74) *Attorney, Agent, or Firm* — Venable LLP (57) ABSTRACT

A feeding apparatus includes a measurement unit measuring an attribute of a sheet fed by a feeding unit to obtain an attribute value; a notification control unit making a notification of information representing sheet types in accordance with the attribute value obtained by the measurement unit; a selection unit accepting selection of a sheet type after the notification; a setting unit setting the sheet type selected by the selection unit as a type of the sheet; a history storage unit storing history information serving as information of sheet types accepted once by the selection unit; and a reference storage unit storing reference information serving as reference attribute values. The notification of the information represents the sheet types in a notification order decided based on the reference attribute values stored in the history information and the attribute value obtained by the measurement unit.

24 Claims, 5 Drawing Sheets

(58) Field of Classification Search
CPC .... G06F 3/1273; G06K 15/16; H04N 1/2323; H04N 1/00915; H04N 1/00681; H04N 1/00724
USPC ....... 358/1.11–1.18; 715/274, 273, 810, 811, 715/744, 745
See application file for complete search history.

(56) References Cited

U.S. PATENT DOCUMENTS

| | | | |
|---|---|---|---|
| 2005/0243153 A1* | 11/2005 | Takahashi | B41L 13/06 347/101 |
| 2006/0239731 A1* | 10/2006 | Suzuki | G03G 15/6508 399/389 |
| 2007/0001366 A1* | 1/2007 | Yano | B65H 3/44 271/9.01 |
| 2011/0135322 A1 | 6/2011 | Masuyama | |
| 2015/0055175 A1 | 2/2015 | Iida | |
| 2019/0253575 A1* | 8/2019 | Wei | H04N 1/00037 |
| 2020/0104656 A1* | 4/2020 | Akatsu | G03G 15/6514 |
| 2020/0192261 A1* | 6/2020 | Ogata | G03G 15/5062 |

FOREIGN PATENT DOCUMENTS

| | | |
|---|---|---|
| JP | 2014-016813 A | 1/2014 |
| JP | 5448765 B2 | 3/2014 |

\* cited by examiner

| SHEET TYPE NAME | SPECULAR REFLECTION | DIFFUSE REFLECTION | PAPER THICKNESS | | 501 |
|---|---|---|---|---|---|
| PLAIN PAPER | V11 | V21 | V31 | | |
| GLOSSY PHOTO | V12 | V22 | V32 | | |
| GLOSSY PREMIUM | V13 | V23 | V33 | | |

502

| SHEET TYPE NAME | SPECULAR REFLECTION | DIFFUSE REFLECTION | PAPER THICKNESS | SELECTION COUNT |
|---|---|---|---|---|
| PLAIN PAPER | V11 | V21 | V31 | 10 |
| GLOSSY PHOTO | V12 | V22 | V32 | 3 |
| GLOSSY PREMIUM | V13 | V23 | V33 | 5 |

| SHEET TYPE NAME | SPECULAR REFLECTION | DIFFUSE REFLECTION | PAPER THICKNESS | 503 |
|---|---|---|---|---|
| PLAIN PAPER | V11 | V21 | V31 | |
| PLAIN PAPER | V12 | V22 | V32 | |
| PLAIN PAPER | V13 | V23 | V33 | |
| GLOSSY PREMIUM | V14 | V24 | V34 | |
| GLOSSY PREMIUM | V15 | V25 | V35 | |
| GLOSSY PHOTO | V16 | V26 | V36 | |

504

| SHEET TYPE NAME | SPECULAR REFLECTION | DIFFUSE REFLECTION | PAPER THICKNESS | SHEET FEEDER |
|---|---|---|---|---|
| PLAIN PAPER | V11 | V21 | V31 | UPPER STAGE |
| GLOSSY PHOTO | V12 | V22 | V32 | LOWER STAGE |
| GLOSSY PREMIUM | V13 | V23 | V33 | UPPER STAGE |

505

| SHEET TYPE NAME | SPECULAR REFLECTION | DIFFUSE REFLECTION | PAPER THICKNESS | USER ID |
|---|---|---|---|---|
| PLAIN PAPER | V11 | V21 | V31 | ID-1 |
| GLOSSY PHOTO | V12 | V22 | V32 | ID-2 |
| GLOSSY PREMIUM | V13 | V23 | V33 | ID-1 |

506

| SHEET TYPE NAME | SPECULAR REFLECTION | DIFFUSE REFLECTION | PAPER THICKNESS | USE TIME ZONE |
|---|---|---|---|---|
| PLAIN PAPER | V11 | V21 | V31 | AM |
| GLOSSY PHOTO | V12 | V22 | V32 | PM |
| GLOSSY PREMIUM | V13 | V23 | V33 | AM |

SHEET FEEDING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a sheet feeding apparatus, an information processing method, and a non-transitory computer-readable storage medium.

Description of the Related Art

An image forming apparatus conventionally has a method of selecting a sheet to be used for printing from a plurality of set sheet types. For example, Japanese Patent No. 5448765 has described a method of displaying as a history a list of sheet types used in the past on the sheet feeder of an image forming apparatus when selecting a sheet type from sheets set on the sheet feeder of the image forming apparatus in the image forming apparatus.

However, it requires a user operation to, for example, search for a target sheet type from a list within a small screen displayed on the display unit of the image forming apparatus. In an arrangement in which sheet types are displayed in order from one used most recently, even sheets of types different in properties from a sheet to be used now are displayed in descending temporal order in which they were held in the history.

SUMMARY OF THE INVENTION

The present invention can improve user-friendliness when deciding a type of sheet to be used.

According to an aspect of the present invention, there is provided a sheet feeding apparatus comprising a sheet feeding unit configured to hold a sheet and feed the sheet; a measurement unit configured to measure an attribute of the sheet fed by the sheet feeding unit to obtain an attribute value of the sheet; a notification control unit configured to control to make a notification of information representing sheet types in accordance with the attribute value of the sheet obtained by measurement by the measurement unit; a selection unit configured to accept selection of a sheet type of the sheet set on the sheet feeding unit after the notification control unit controls to make the notification; a setting unit configured to set the sheet type selected by the selection unit as a type of the sheet fed by the sheet feeding unit; a history storage unit configured to store history information serving as information of sheet types accepted once by the selection unit; and a reference storage unit configured to store reference information serving as reference attribute values corresponding to the respective sheet types, wherein the notification control unit is configured to control to make the notification of the information representing the sheet types in a notification order decided based on the reference attribute values of the sheet types stored in the history information and the attribute value obtained by measuring, by the measurement unit, the sheet set on the sheet feeding unit.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[Apparatus Arrangement]

Figure 1:
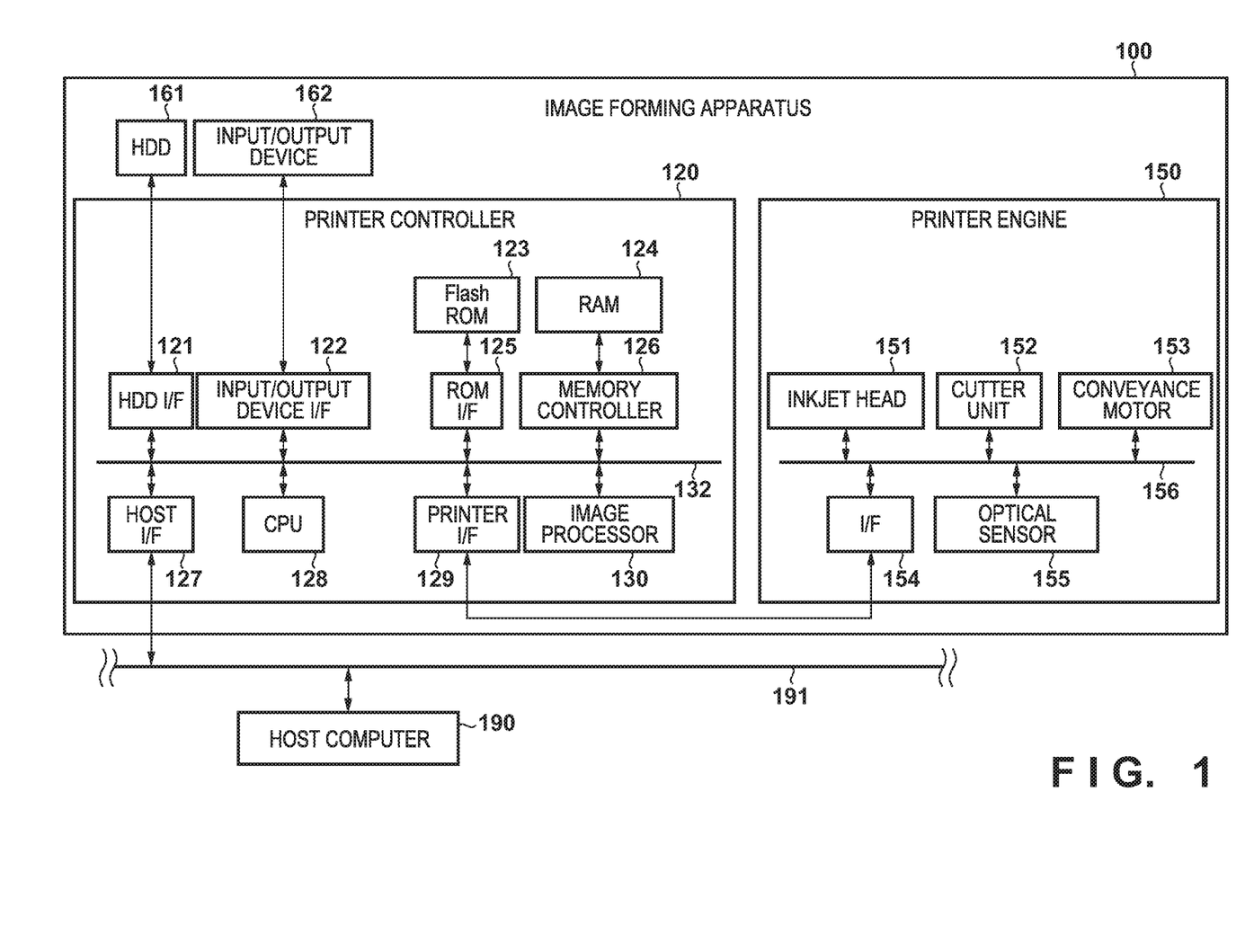
FIG. 1 is a schematic block diagram showing the internal arrangement of an image forming apparatus according to an embodiment of the present invention.

FIG. 1 is a block diagram showing the schematic arrangement of an image forming apparatus according to an embodiment. The image forming apparatus has only the printing function in this embodiment, but is not limited to this. For example, the image forming apparatus may further include a reading device configured to read an image on a document and function as a copying machine, or may function as a multi-function peripheral (MFP) equipped with other functions additionally. The image forming apparatus may be applied to a sheet feeding apparatus configured to feed sheets.

In FIG. 1, an image forming apparatus 100 includes a printer controller 120, a printer engine 150, an HDD 161, and an input/output device 162. The image forming apparatus 100 can be connected to a host computer 190 via a network 191. The printer controller 120 includes an HDD interface (I/F) 121, an input/output device I/F 122, a ROM I/F 125, and a memory controller 126. The printer controller 120 includes a host I/F 127, a CPU (Central Processing Unit) 128, a printer engine I/F 129, and an image processor 130. These units are connected via a system bus 132. The printer controller 120 includes a flash ROM 123 and a RAM 124, which are connected to the system bus 132 via the ROM I/F 125 and the memory controller 126, respectively.

The CPU 128 takes the form of a microprocessor (microcomputer) and controls the overall operation of the image forming apparatus 100 by executing programs and activating hardware. The flash ROM 123 stores programs to be executed by the CPU 128 and various data necessary for various operations of the image forming apparatus 100. The RAM 124 is used as the work area of the CPU 128 or as the temporary storage area of various reception data, and stores various setting data.

The image processor 130 performs various image processes such as processing of bitmapping (converting) print data (for example, data described in the page description language) handled in the image forming apparatus 100 into image data (bitmap image data), and other image processes. Also, the image processor 130 converts the color space (for example, YCbCr) of image data included in input print data into a standard RGB color space (for example, sRGB). The image processor 130 performs, on image data, various image processes such as resolution conversion into an effective (printable by the image forming apparatus 100) number of pixels, image analysis, and image correction. Image data obtained by these image processes is stored in the RAM 124 or the HDD 161.

The printer engine 150 is a printing unit configured to form an image. The printer engine 150 includes an inkjet head 151, a cutter unit 152, a conveyance motor 153, an interface 154 with the printer controller 120, and an optical sensor 155. The respective units are connected via a system bus 156.

The inkjet head 151 is a printing unit configured to print an image, and prints an image on a sheet based on image data. The inkjet head 151 holds, for example, printheads of a plurality of colors. The inkjet head 151 discharges ink from the printheads in synchronization with the conveyance of a sheet, forming an image on the sheet. The image forming apparatus 100 according to this embodiment is, for example, an inkjet printer using ink as a printing material, but is not limited to this. The present invention is applicable to image forming apparatuses of various printing types such as a thermal printer (for example, sublimation or thermal transfer), a dot impact printer, an LED printer, and a laser printer.

The cutter unit 152 is a mechanism of cutting roll paper used as a printing medium (to be referred to as a sheet hereinafter) in this embodiment. The cutter unit 152 cuts image-printed roll paper into a predetermined length. For a type of sheet that scatters paper dust upon cutting by the cutter unit 152, a setting to draw a cutting dust reduction line at a cutting position is stored in the flash ROM 123 in order to prevent scattering of paper dust upon cutting. Independently of the cutting line reduction, operation settings of the cutter unit 152 can be stored in the flash ROM 123 for each sheet type. For a type of sheet that cannot be cut using the cutter unit 152, a setting (user cutting) to not move the cutter unit 152 because the user cuts the sheet with scissors is stored in the flash ROM 123. For a type of sheet on which a straight line to be cut is curved unless the user cuts roll paper while holding it down, a setting (eject cutting) to move the cutter unit 152 by a user operation is stored in the flash ROM 123. For a type of sheet for which neither user cutting nor eject cutting is set, a setting (auto cutting) to cut the sheet by the cutter unit 152 is stored in the flash ROM 123.

The conveyance motor 153 is a motor for driving a conveyance roller configured to convey roll paper and is controlled by the CPU 128. The optical sensor 155 is a detection unit for detecting the attribute values of a printing medium, and is a reflection optical sensor including an LED (Light Emitting Diode) serving as a light emitting element, a specular reflected light receiving element, and a diffuse light receiving element. The image forming apparatus 100 uses the optical sensor 155 to measure the attribute values of a printing medium on a platen (not shown), such as the thickness of a sheet and the intensities of specular reflected light and diffuse-reflected light.

The input/output device 162 includes an input unit for inputting information by performing various operations by the user, and an output unit for notifying the user of various kinds of information. The input unit includes hard keys, a panel, and a microphone capable of voice input. An output unit may notify the user of information by outputting a sound (for example, buzzer or voice) based on acoustic information from a voice generator. At the time of sheet feeding, the user selects a sheet type using the input/output device 162 and instructs the image forming apparatus 100 about the selected sheet type. Then, the image forming apparatus 100 performs conveyance set for each sheet type.

The HDD 161 is a nonvolatile storage area. Programs to be executed by the CPU 128, print data, and setting information necessary for various operations of the image forming apparatus 100 can be stored in the HDD 161 and read out from it. Note that another large-capacity storage device such as a flash memory may replace the HDD 161.

The input/output device 162 is arranged in the image forming apparatus 100 in this embodiment, but is not limited to this and may be, for example, connected as an external device via the network 191. Alternatively, the host computer 190 and a display connected to the host computer 190 may serve as the input/output device 162. In addition to the input/output device 162, the image forming apparatus 100 may allow connecting another input/output device via the network 191 or the like.

The host computer 190 is, for example, an information processing apparatus serving as a print data supply source, and a printer driver (not shown) for controlling the image forming apparatus 100 is installed. Instead of the host computer 190, a data providing apparatus that can function as a print data supply source, such as an image reader, a digital camera, or a smartphone may be provided. The image forming apparatus 100 is connected to each device not only via the network 191 but also directly by wireless communication.

Figure 2:
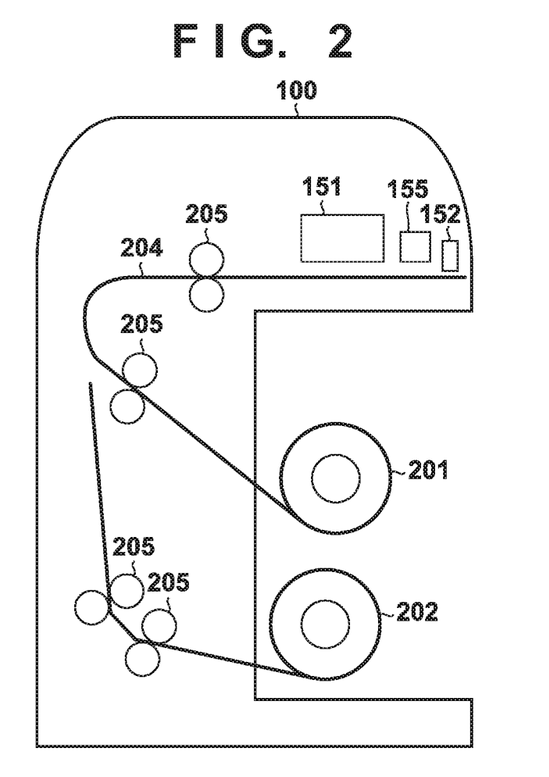
FIG. 2 is a schematic view of the section of the image forming apparatus according to the embodiment of the present invention.

FIG. 2 is a schematic view of the section of the image forming apparatus 100 according to this embodiment. FIG. 2 shows a portion regarding conveyance of roll paper. The image forming apparatus 100 according to this embodiment includes two roll paper tubes 201 and 202 in which different types of roll paper can be set. FIG. 2 shows a positional relationship at a place where roll paper 204 conveyed from the upper roll paper tube 201 by conveyance rollers 205 along a conveyance path is measured by the optical sensor 155 provided at a place where it faces the platen (not shown) in the image forming apparatus 100. The inkjet head 151 prints an image by discharging ink onto the roll paper 204 conveyed from the upper roll paper tube 201. After a switching operation from roll paper at the upper stage to one at the lower stage using the conveyance rollers 205 in the image forming apparatus 100, roll paper can be supplied even from the lower roll paper tube 202.

At the time of sheet feeding, the image forming apparatus 100 measures the specular reflected light intensity, diffuse-reflected light intensity, and roll paper thickness of the roll paper 204 using the optical sensor 155. The printed roll paper is cut by the cutter unit 152 into a length the user wants.

Note that the arrangement shown in FIG. 2 is an example, and the number of compatible roll paper sheets (number of roll paper tubes), the positional relationship between the roll paper tube and the printhead, the arrangement position of the optical sensor 155, and the like may change. The image forming apparatus 100 according to this embodiment has been described in regard to an arrangement using roll paper, but the present invention may be applied to an image forming apparatus using cut paper.

[Display Example]

Figure 3:
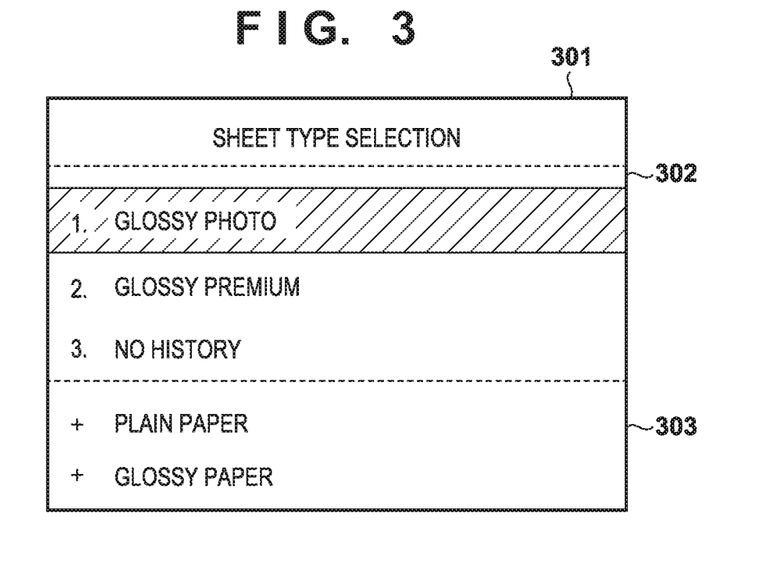
FIG. 3 is a view showing an example of a sheet type selection screen layout according to the embodiment of the present invention.

FIG. 3 is a view showing an example of the panel display of the input/output device 162 when selecting a sheet type. For example, when printing, it is designated which of sheet types is used to print in the image forming apparatus 100 according to this embodiment. A sheet type selection screen 301 is an example of the layout of a screen displayed when selecting a sheet type. The sheet type selection screen 301 includes the region of a candidate display 302 and the region of a sheet type list 303. The candidate display 302 is a region where sheet types are displayed in a display order in which sheets likely to be selected are displayed at the top based on the relationship between history data according to this embodiment and the detection result of currently set roll paper. In this embodiment, the history data is history information of sheet types selected by the user from the panel, which will be described in detail later. FIG. 3 shows an example in which three types are presented as the number of sheet candidates displayed on the candidate display 302. However, if the display region of the input/output device 162 has room, the number of sheet candidates may be further increased. The sheet type list 303 represents a list of sheet types settable in the image forming apparatus 100. Here, "plain paper" and "glossy paper" are displayed, and if a candidate is designated, more detailed classifications are displayed and can be selected. Note that "plain paper" and "glossy paper" in the list shown in FIG. 3 are an example of rough sheet type classifications, and the classifications are not limited to this. If the display region of the input/output device 162 has room, a larger number of classifications may be displayed.

In the example shown in FIG. 3, the font color and background color of "glossy photo", which is a most likely sheet type as the sheet type of the fed roll paper 204, are reversed from those of the display of other sheet types in the list of the candidate display 302, and "glossy photo" is displayed at the top of the list. Note that the display method for displaying a likely sheet type is not limited to the example of FIG. 3. For example, the font size of a more likely sheet type may be increased or a more likely sheet type may be displayed in a more prominent color.

A formula to calculate a determination distance J for candidate selection used in this embodiment will be described below. In this embodiment, a smaller value of the determination distance J represents that a sheet type measured by the optical sensor 155 is more likely to be close to a compared sheet type. That is, the degree of similarity between a sheet type held as history data and a sheet type set in the image forming apparatus 100 is calculated, and a sheet type to be preferentially displayed is decided in accordance with the degree. Note that this embodiment has exemplified an image forming apparatus including two roll paper tubes. However, when the image forming apparatus includes a larger number of roll paper tubes, the determination distances J to roll paper sheets set on the respective roll paper tubes may be calculated.

In this embodiment, V1, V2, and V3 represent the specular reflected light intensity, diffuse-reflected light intensity, and roll paper thickness measured by the optical sensor 155, respectively. In this embodiment, reference values used as the reference attribute values of each sheet type stored in the flash ROM 123 are attribute values measured finally for the sheet type. V1L, V2L, and V3L represent the specular reflected light intensity, diffuse-reflected light intensity, and roll paper thickness, respectively. The reference value of each attribute value is not limited to this. For example, the average of values measured a predetermined number of times may be used as the reference value or a predetermined value may be used as the reference value. A value calculated by equation (1) is defined as the determination distance J of each sheet type with respect to measurement values:

$$J=\alpha*(V1-V1L)^2+\beta*(V2-V2L)^2+\gamma*(V3-V3L)^2 \quad (1)$$

where $\alpha$, $\beta$, and $\gamma$ are the coefficients used to calculate the determination distance and arbitrary values are set. The values of the coefficients $\alpha$, $\beta$, and $\gamma$ are held in, for example, a storage unit such as the flash ROM 123. In this embodiment, how much importance is given to the specular reflected light intensity, the diffuse-reflected light intensity, or the roll paper thickness can be changed by multiplying by the coefficients the sum of squares of the respective components, which is a general distance calculation formula. For example, when the specular reflected light intensity has a great influence, the coefficient $\alpha$ is increased to improve the determination precision.

In this embodiment, the determination distance J between the attribute values of fed roll paper and the attribute values of each sheet type held as history data is measured, and sheet types are displayed on the candidate display 302 in ascending order of the determination distance. In this embodiment, when a plurality of sheet types have the same value of the determination distance J, the selection counts of the sheet types by the user that are included in history data are referred to, and the sheet types are displayed at the top in descending order of the selection count. Note that different history data can be used for the arrangement of preferentially displaying a given sheet type when a plurality of sheet types have the same value of the determination distance J. An example of available history data will be described later with reference to FIG. 5.

As another arrangement, a list including likely sheet types may be displayed at the top in a list displayed in the sheet type list 303. Alternatively, the user may select elements used for the determination distance J by designating the $\alpha$, $\beta$, and $\gamma$ values by himself. In this case, when no designation is accepted from the user, values held in advance are used.

Further, the calculation of the determination distance J is not limited to the above-described equation (1), and various formulas may be used as long as the similarity between (V1, V2, V3) and (V1L, V2L, V3L) can be calculated. When the user does not select a sheet type and leaves the sheet type selection screen 301 intact for a predetermined time, a most likely sheet type may be automatically selected to advance processing. In this case, if a displayed sheet type surely meets the user's intension, a user operation can be skipped. Also, the user may be notified of the above-described sheet type candidates not by display but by voice.

[Processing Sequence]

Figure 4A:
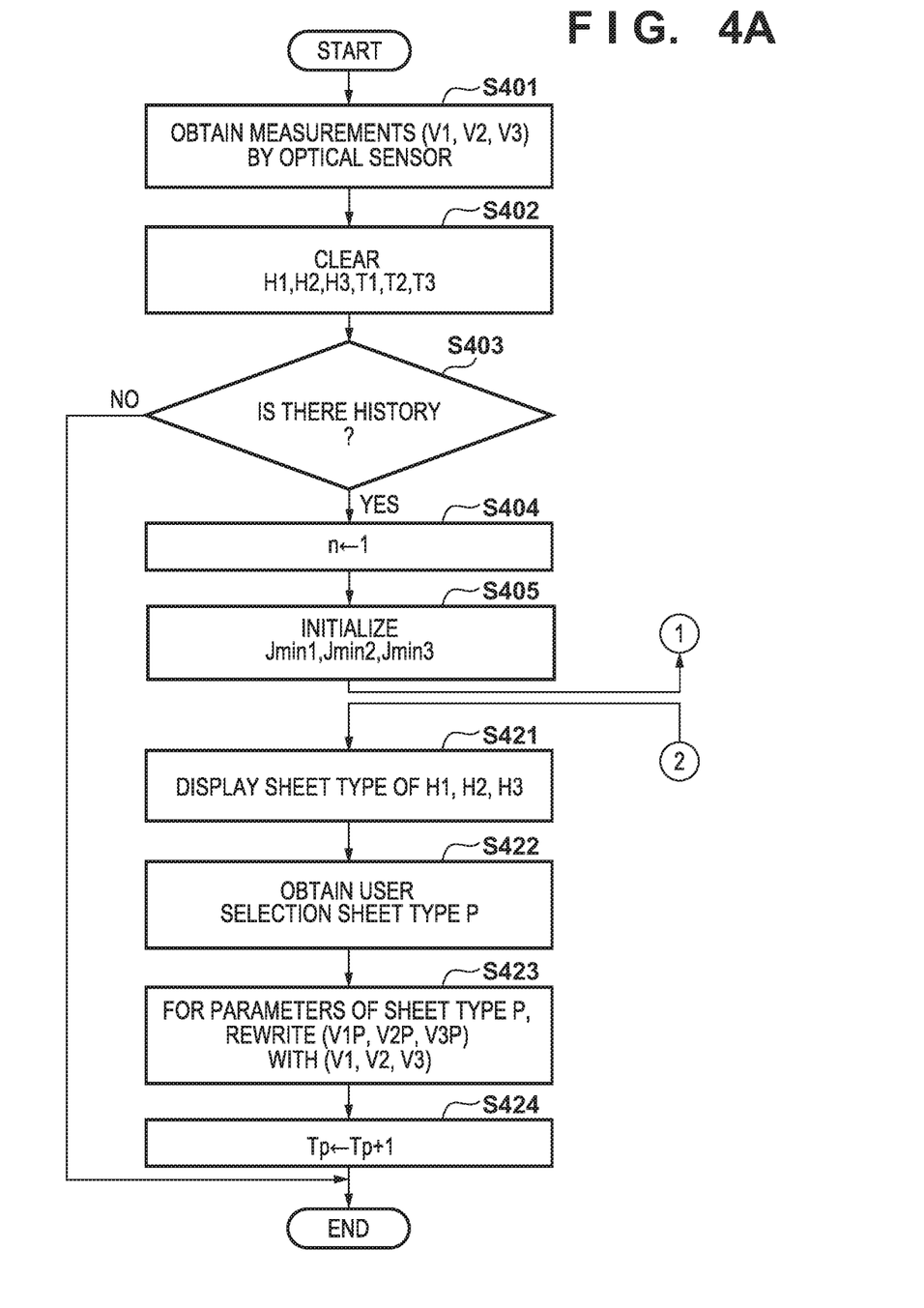
FIGS. 4A and 4B are flowcharts of processing of an operation according to the embodiment of the present invention.
Figure 4B:
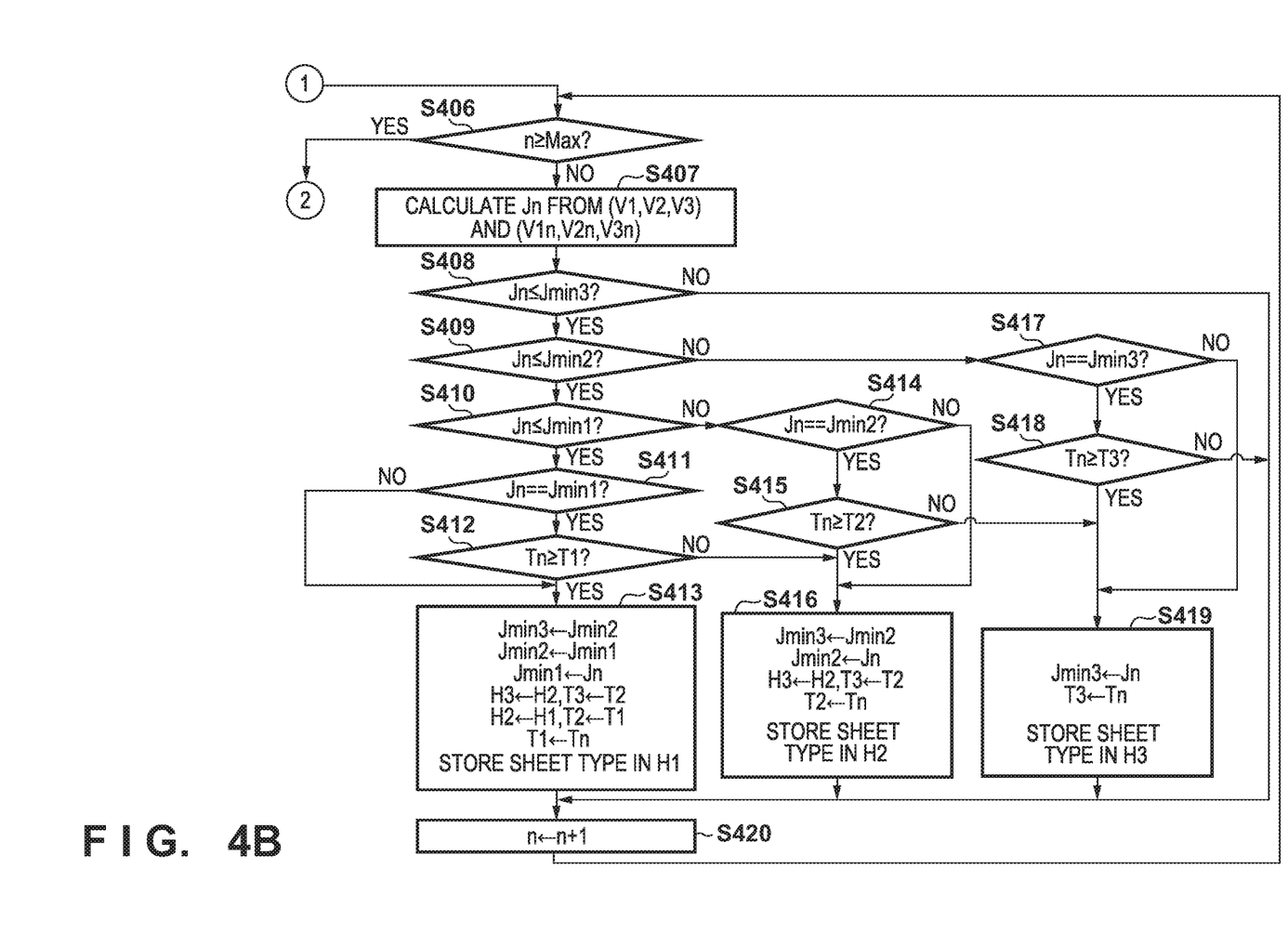

FIGS. 4A and 4B are flowcharts showing a sequence of selecting sheet type candidates to be presented to the user using the input/output device 162 when feeding roll paper. This processing sequence is implemented by, for example, reading out a program held in the HDD 161 or the like by the CPU 128 and executing it.

In step S401, the image forming apparatus 100 feeds the roll paper 204 onto the platen (not shown) and measures the specular reflected light intensity V1, the diffuse-reflected light intensity V2, and the roll paper thickness V3 using the optical sensor 155.

In step S402, the image forming apparatus 100 clears (initializes) storage areas H1, H2, and H3 of sheet type candidates to be displayed on the input/output device 162, and storage areas T1, T2, and T3 of selection counts each representing the number of times by which a corresponding sheet type has been used so far. The storage areas H1, H2, H3, T1, T2, and T3 are provided in the RAM 124. This initialization may be to substitute "0" or blank the storage area.

In step S403, the image forming apparatus 100 determines whether there is a history of the sheet types of roll paper sheets used before. The sheet type history data is held in the RAM 124 or the HDD 161 and can be referred to in order to make a determination. If the image forming apparatus 100 determines that there is a history (YES in step S403), the process advances to step S404. If the image forming apparatus 100 determines that there is no history (NO in step S403), the processing sequence ends without displaying any candidate. Note that a history of sheet types may be registered in advance in the process of product manufacturing. For example, packaged sheet types are set as a history or sheet types most used in the market are set as a history so that candidates can be presented to the user. If there is no history and the processing sequence ends, a message that there is no history may be displayed, as represented on the third line of the candidate display 302 in FIG. 3.

In step S404, the image forming apparatus 100 initializes a sheet type counter n to "1". The sheet type counter n is held in the RAM 124. The sheet type counter corresponds to a sheet type stored as history data, and the value of the sheet type counter is held in correspondence with the sheet type.

In step S405, the image forming apparatus 100 initializes the values of determination distances Jmin1, Jmin2, and Jmin3 into which the determination distance values of three sheet types displayed on the candidate display 302 of the sheet type selection screen 301 are substituted. As a value used in this initialization, a large value which is not actually generated is substituted. As shown in FIG. 3, three determination distances Jmin are used to represent three candidates on the candidate display 302 of FIG. 3. Hence, the number of determination distances Jmin varies in accordance with the number of candidates displayed on the candidate display 302. In this embodiment, the determination distances Jmin have a relation: Jmin1 Jmin2 Jmin3.

In step S406, the image forming apparatus 100 determines whether the value of the sheet type counter n is equal to or larger than a sheet type count Max. The sheet type count Max represents the number of sheet types stored as history data in the image forming apparatus 100. For example, when the image forming apparatus 100 has history data of 10 sheet types, the sheet type count Max is "10". If the image forming apparatus 100 determines that the value of the sheet type counter n is equal to or larger than the sheet type count Max (YES in step S406), the process advances to step S421. This means that the calculation of the determination distances J of all sheet types in the history and the comparison have completed. If the image forming apparatus 100 determines that the value of the sheet type counter n is smaller than the sheet type count Max (NO in step S406), the process advances to step S407.

In step S407, the image forming apparatus 100 calculates a determination distance Jn from the specular reflected light intensity V1, diffuse-reflected light intensity V2, and roll paper thickness V3 measured by the optical sensor 155, and the specular reflected light intensity V1$n$, diffuse-reflected light intensity V2$n$, and roll paper thickness V3$n$ stored as values of the nth sheet type in history data. The determination distance Jn is calculated based on the above-described equation (1) according to equation (2):

$$Jn=\alpha*(V1-V1n)^2+\beta*(V2-V2n)^2+\gamma*(V3-V3n)^2 \quad (2)$$

In step S408, the image forming apparatus 100 compares Jn calculated in step S407 with Jmin3. If Jn is larger than Jmin3 as a result of the comparison (NO in step S408), the process advances to step S420. If Jn is equal to or smaller than Jmin3 (YES in step S408), the process advances to step S409.

In step S409, the image forming apparatus 100 compares Jn calculated in step S407 with Jmin2 If Jn is larger than Jmin2 as a result of the comparison (NO in step S409), the process advances to step S417. If Jn is equal to or smaller than Jmin2 (YES in step S409), the process advances to step S410.

In step S410, the image forming apparatus 100 compares Jn calculated in step S407 with Jmin1. If Jn is larger than Jmin1 as a result of the comparison (NO in step S410), the process advances to step S414. If Jn is equal to or smaller than Jmin1 (YES in step S410), the process advances to step S411.

In step S411, the image forming apparatus 100 determines whether Jn equals Jmin1. If Jn equals Jmin1 (YES in step S411), the process advances to step S412. If Jn differs from Jmin1 (Jn is smaller than Jmin1) (NO in step S411), the process advances to step S413.

In step S412, the image forming apparatus 100 compares a count T1 with a count Tn at which a sheet type corresponding to the sheet type counter n has been selected so far. The count T1 has a value substituted along the preceding processing. The count Tn is obtained by referring to history data of the sheet type corresponding to the sheet type counter n. If Tn is equal to or larger than T1 as a result of the comparison (YES in step S412), the process advances to step S413. If Tn is smaller than T1 (NO in step S412), the process advances to step S416.

In step S413, the image forming apparatus 100 determines as a result of comparison with up to the nth sheet type that the nth sheet type has a shortest distance that uses as indices the specular reflected light intensity V1, diffuse-reflected light intensity V2, and roll paper thickness V3 measured by the optical sensor 155. To save values of other ordinal ranks, the image forming apparatus 100 substitutes the Jmin2 value into Jmin3, the Jmin1 value into Jmin2, and the Jn value into Jmin1. As for sheet types, the image forming apparatus 100 substitutes the value of the storage area H2 representing a sheet type of a second highest degree of approximation into the storage area H3 representing a sheet type of a third highest degree of approximation, and substitutes the H1 value into the storage area H2. The image forming apparatus 100 stores information of the nth sheet type in the storage area H1 representing a sheet type of a highest degree of approximation. As for selection counts, the image forming apparatus 100 substitutes the value of the storage area T2 representing the selection count of the sheet type of the second highest degree of approximation into the storage area T3 representing the selection count of the sheet type of the third highest degree of approximation, substitutes the value of the storage area T1 into T2, and stores the Tn value in T1. After that, the process advances to step S420.

In step S414, the image forming apparatus 100 determines whether Jn equals Jmin2. If Jn equals Jmin2 (YES in step S414), the process advances to step S415. If Jn differs from Jmin2 (Jn is smaller than Jmin2) (NO in step S414), the process advances to step S416.

In step S415, the image forming apparatus 100 compares T2 with Tn. If Tn is equal to or larger than T2 as a result of the comparison (YES in step S415), the process advances to step S416. If Tn is smaller than T2 (NO in step S415), the process advances to step S419.

In step S416, the image forming apparatus 100 substitutes the Jmin2 value into Jmin3 and the Jn value into Jmin2 because the nth sheet type has a second highest degree of approximation to the values measured by the optical sensor 155. Also, the image forming apparatus 100 substitutes the H2 value into H3 and stores, in H2, information representing the nth sheet type. Further, the image forming apparatus 100 substitutes the T2 value into T3 and stores the Tn value in T2. The process then advances to step S420.

In step S417, the image forming apparatus 100 determines whether Jn equals Jmin3. If Jn equals Jmin3 (YES in step S417), the process advances to step S418. If Jn differs from Jmin3 (Jn is smaller than Jmin3) (NO in step S417), the process advances to step S419.

In step S418, the image forming apparatus 100 compares T3 with Tn. If Tn is equal to or larger than T3 as a result of the comparison (YES in step S418), the process advances to step S419. If Tn is smaller than T3 (NO in step S418), the process advances to step S420.

In step S419, the image forming apparatus 100 substitutes the Jn value into Jmin3 because the nth sheet type has a third highest degree of approximation to the values measured by the optical sensor 155. Also, the image forming apparatus 100 stores the nth sheet type in H3. Further, the image forming apparatus 100 stores the Tn value in T3. The process then advances to step S420.

In step S420, the image forming apparatus 100 substitutes n+1 into the sheet type counter n (that is, increments the n value by one), and the process returns to step S406.

In step S421, the calculation of the determination distances J of all sheet types in the history and the comparison have completed, so the image forming apparatus 100 displays sheet types represented by H1, H2, and H3 as sheet type candidates on the input/output device 162 in order of H1, H2, and H3. That is, the H1, H2, and H3 values are displayed sequentially from the top on the candidate display 302 of FIG. 3.

In step S422, the image forming apparatus 100 accepts the selection of a sheet type P from the user via the sheet type selection screen 301 and obtains information of the selected sheet type P.

In step S423, the image forming apparatus 100 determines that the specular reflected light intensity V1, diffuse-reflected light intensity V2, and roll paper thickness V3 measured by the optical sensor 155 are data of the sheet type P. The image forming apparatus 100 overwrites the storage unit to save the specular reflected light intensity V1, diffuse-reflected light intensity V2, and roll paper thickness V3 with the specular reflected light intensity V1P, diffuse-reflected light intensity V2P, and roll paper thickness V3P of the sheet type P.

In step S424, the image forming apparatus 100 adds "1" to the selection count Tp of the sheet type P (that is, increments the Tp value by one). Note that Tp is held in the storage unit in correspondence with the sheet type P. Thereafter, the processing sequence ends.

When substituting the Jn value into one of Jmin1, Jmin2, and Jmin3, an excessively low degree of approximation may not be substituted so that an improper sheet type is not set as a candidate. In this case, a threshold Jth may be decided in advance, and if Jn>Jth, it may be determined that the degree of approximation is excessively low.

[History Data]

Figure 5:
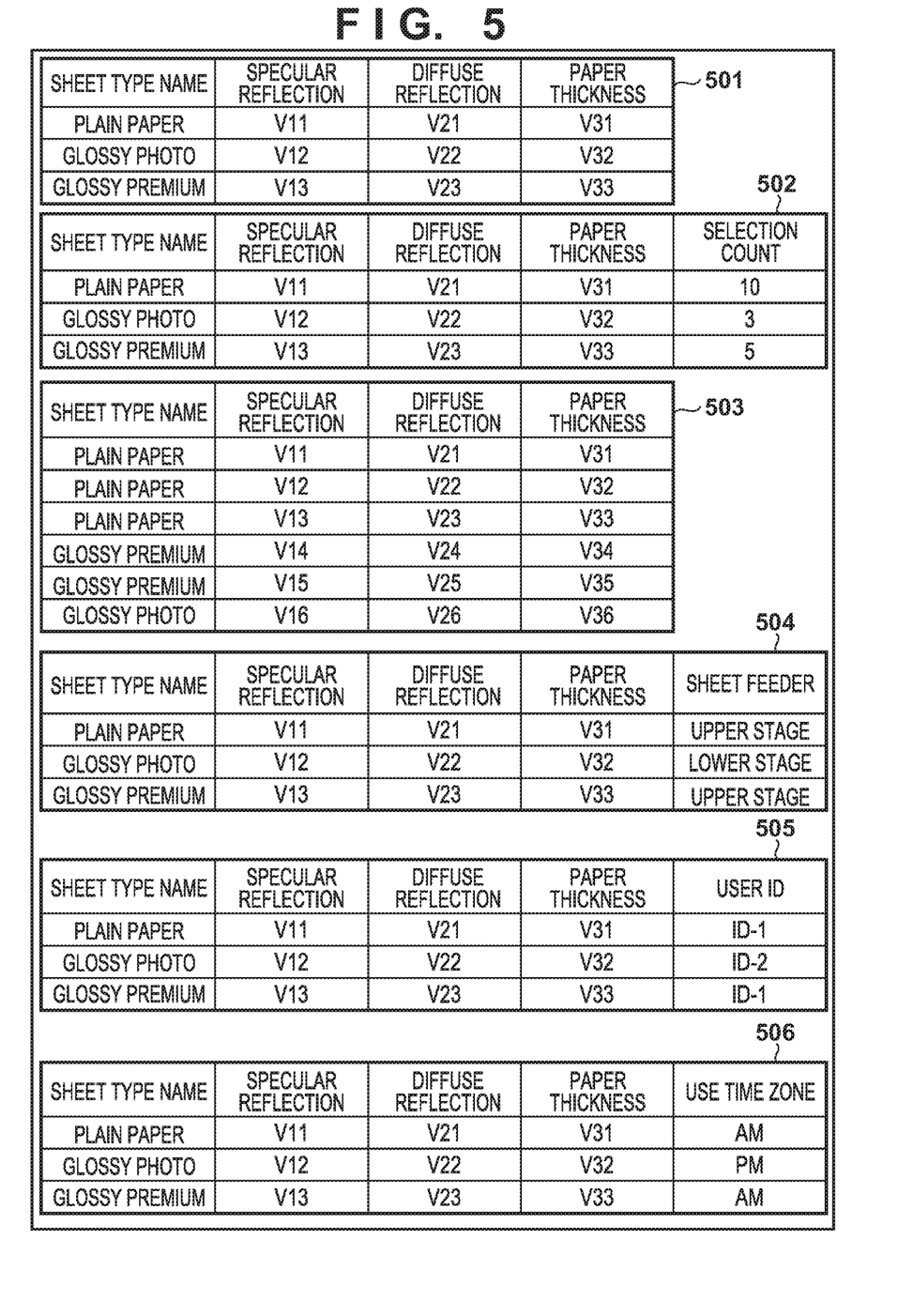
FIG. 5 is a table showing an example of the save items of history data according to the embodiment of the present invention.

FIG. 5 is a table showing an example of the save items of history data according to the embodiment of the present invention. Each history data below is held in the HDD 161 or the like. Any of the history data shown in FIG. 5 may be used to decide a sheet type to be preferentially displayed in a list displayed on the sheet type selection screen 301. In the above-described processing sequence of FIGS. 4A and 4B, history data 502 is used. Examples of the structures of the following history data are not always exclusive and may be combined if necessary. A selected sheet type is stored as a sheet type used before in history data. In this embodiment, the selected sheet type is set as history data in correspondence with the following information. Only the history of the sheet type used may be used as history data.

History data 501 represents the structure of history data in which the finally measured specular reflected light intensity V1, diffuse-reflected light intensity V2, and roll paper thickness V3 are associated and saved for each sheet type. Every time the same sheet type is used, each value in the history data 501 is updated to a new measurement result obtained by the optical sensor 155.

The history data 502 represents an example of the structure of history data in which a sheet type selection count by the user is associated and saved in addition to the contents of the history data 501. When sheet types have the same value of the determination distance J, the use of the selection count information makes it possible to display a sheet type of a higher selection count at the top of the list.

History data 503 represents an example of the structure of history data when different measurement values are saved even for the same sheet type if the history capacity permits. In this structure, a measurement value is not updated but is added for each sheet type, unlike the history data 501.

In history data 504, sheet feeder information representing which of roll paper of the upper roll paper tube 201 and roll paper of the lower roll paper tube 202 was used for each sheet type is associated and held in addition to the contents of the history data 501. By using the history data 504, candidates having close sheet type determination distances can be selected from candidates corresponding to the same sheet feeder so that they come to the top in a displayed list.

In history data 505, the user ID of a user who used the image forming apparatus 100 is associated and held in addition to the contents of the history data 501. The user ID is identification information assigned to uniquely identify a user who uses the image forming apparatus 100. For example, when using the image forming apparatus 100, the user ID of a user is obtained. When the user prints, the image forming apparatus 100 associates the user ID with a sheet type used and holds them. When the user is to print later, the same sheet type can be displayed at the top of the list by referring to history data corresponding to the user ID of the user.

In history data 506, information of a time zone, ie., time period, such as AM or PM, for example, in which the image forming apparatus 100 was used is associated and held in addition to the contents of the history data 501. The use time information may be obtained from the timepiece (not shown) of the image forming apparatus 100. By using the history data 506, for example, candidates can be selected from candidates of the same use time zone (or period) so that they come to the top of the displayed list.

As described above, according to this embodiment, a sheet type likely to be selected is displayed at the top of the selection screen based on a printing medium detection result and history data. This can improve user-friendliness when the user selects a sheet type at the time of sheet setting.

The processing in FIGS. 4A and 4B is executed by the CPU 128 of the image forming apparatus 100 in the above-described embodiment, but may be executed by, for example, the CPU 128 of the host computer 190 using the host computer or an external memory. Sheet type candidates may be displayed on a display (not shown) connected to the host computer 190. In this case, the host computer 190 obtains values measured by the optical sensor 155 of the image forming apparatus 100 in the processing in step S401.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-024689, filed Feb. 14, 2019, which is hereby incorporated by reference herein in its entirety.

What is claimed is:

1. A sheet feeding apparatus comprising:
a feeding roller configured to feed a sheet;
a display configured to display a sheet type selection window for a user's selection of a type of a sheet fed by the feeding roller;
a storage unit configured to store sheet types which were selected on the sheet type selection window in the past; and
a controller including at least one processor and configured to:
obtain measurement results of attribute values, measured by a sensor, of a sheet fed by the feeding roller;
obtain reference attribute values for the sheet types, stored in the storage unit, which were selected on the sheet type selection window in the past;
select sheet type candidates, which have attribute values similar to the measurement results, from the sheet types of which the reference attribute values are obtained from the storage unit and which were selected on the sheet type selection window in the past;
control the display to display the sheet type selection window indicating the sheet type candidates in an order determined based on the reference attribute values and the measurement results;
accept a user's selection of a sheet type from the sheet type candidates; and
set the sheet type of the user's selection as a sheet type of the sheet fed by the feeding roller,
wherein the attribute values include at least one of specular reflection, diffuse reflection, and thickness of the sheet,
the reference attribute values are associated with information of a time period in which a sheet was used, and
the controller is configured to determine the order in accordance with the reference attribute values and the time period in which a sheet is used.

2. The sheet feeding apparatus according to claim 1, wherein the controller is configured to calculate degrees of similarity between the reference attribute values and the measurement results, and control the display to preferentially display in the sheet type selection window a sheet type candidate more similar to the sheet fed by the feeding roller.

3. The sheet feeding apparatus according to claim 2, wherein the controller is configured to control the display to display each sheet type candidate with a display color or font size in accordance with the degree of similarity.

4. The sheet feeding apparatus according to claim 1, wherein the controller is configured to obtain selection counts of the sheet types which were selected in the user's past selection of a type of a sheet fed by the feeding roller, and determine the order in accordance with the selection counts.

5. The sheet feeding apparatus according to claim 1, further comprising a plurality of sheet set sections, on each of which a sheet is set,
wherein the reference attribute values are associated with the plurality of sheet set sections.

6. The sheet feeding apparatus according to claim 1, wherein the reference attribute values are associated with identification information of a user who selected a sheet type, and
the controller is configured to determine the order based on the identification information.

7. The sheet feeding apparatus according to claim 1, wherein when a user's selection of a sheet type is accepted, a reference attribute value, of the user's selection of a sheet type, in the reference attribute values is updated with the measurement result.

8. The sheet feeding apparatus according to claim 1, further comprising a print head that discharges the liquid to a sheet fed by the feeding roller for printing an image while facing the sheet.

9. An information processing method for a sheet feeding apparatus including a feeding roller configured to feed a sheet, a display configured to display a sheet type selection window for a user's selection of a type of sheet fed by the feeding roller, and a storage unit configured to store sheet types which were selected on the sheet type selection window in the past, the information processing method comprising:
obtaining measurement results of attribute values, by a sensor, of a sheet fed by the feeding roller;
obtaining reference attribute values for the sheet types, stored in the storage unit, which were selected on the sheet type selection window in the past;
selecting sheet type candidates, which have attribute values similar to the measurement results, from the sheet types of which the reference attribute values are obtained from the storage unit and which were selected on the sheet type selection window in the past;

controlling the display to display the sheet type selection window indicating the sheet type candidates in an order determined based on the reference attribute values and the measurement results;

accepting a user's selection of a sheet type from the sheet type candidates; and setting the sheet type of the user's selection as a sheet type of the sheet fed by the feeding roller, wherein the attribute values include at least one of specular reflection, diffuse reflection, and thickness of the sheet, the reference attribute values are associated with information of a time period in which a sheet was used, and in the controlling, the order is determined in accordance with the reference attribute values and the time period in which a sheet is used.

10. The information processing method according to claim 9, wherein in the controlling, degrees of similarity between the reference attribute values and the measurement results are calculated, and the display is controlled to preferentially display in the sheet type selection window a sheet type candidate more similar to the sheet fed by the feeding roller.

11. The information processing method according to claim 10, wherein in the controlling, each sheet type candidate is displayed with a display color or font size in accordance with the degree of similarity.

12. The information processing method according to claim 9, further comprising obtaining selection counts of the sheet types which were selected in the user's past selection of a type of a sheet fed by the feeding roller, wherein in the controlling the order is determined in accordance with the selection counts.

13. The information processing method according to claim 9, wherein the reference attribute values are associated with identification information of a user who selected a sheet type, and in the controlling, the order is determined based on the identification information.

14. A non-transitory computer-readable storage medium storing a program for causing a computer on an apparatus, which includes a feeding roller configured to feed a sheet, a display configured to display a sheet type selection window for a user's selection of a type of a sheet fed by the feeding roller, and a storage unit configured to store sheet types which were selected on the sheet type selection window in the past, to execute a process, the process comprising:

obtaining measurement results of attribute values, measured by a sensor, of a sheet fed by the feeding roller;

obtaining reference attribute values for the sheet types, stored in the storage unit, which were selected on the sheet type selection window in the past;

selecting sheet type candidates, which have attribute values similar to the measurement results, from the sheet types of which the reference attribute values are obtained from the storage unit and which were selected on the sheet type selection window in the past;

controlling the display to display the sheet type selection window indicating the sheet type candidates in an order determined based on the reference attribute values and the measurement results;

accepting a user's selection of a sheet type from the sheet type candidates; and setting the sheet type of the user's selection as a sheet type of the sheet fed by the feeding roller, wherein the attribute values include at least one of specular reflection, diffuse reflection, and thickness of the sheet, the reference attribute values are associated with information of a time period in which a sheet was used, and in the controlling, the order is determined in accordance with the reference attribute values and the time period in which a sheet is used.

15. A sheet feeding apparatus comprising:

a feeding roller configured to feed a sheet;

a storage unit configured to store sheet types which were selected as sheets being fed by the feeding roller by a user in the past; and a controller including at least one processor and configured to:

obtain measurement results of attribute values, measured by a sensor, of a sheet fed by the feeding roller;

obtain reference attribute values for the sheet types, stored in the storage unit, which were selected as sheets being fed by the feeding roller by a user in the past;

select sheet type candidates, which have attribute values similar to the measurement results, from the sheet types of which the reference attribute values are obtained from the storage unit and which were selected on the sheet type selection window in the past;

generate selection information indicating the sheet type candidates and an order of the sheet type candidates which is determined based on the reference attribute values and the measurement results;

accept a selection of a sheet type from the sheet type candidates; and set the sheet type of the selection as a sheet type of the sheet fed by the feeding roller, wherein the attribute values include at least one of specular reflection, diffuse reflection, and thickness of the sheet, the reference attribute values are associated with information of a time period in which a sheet was used, and the controller is configured to determine the order in accordance with the reference attribute values and the time period in which a sheet is used.

16. The sheet feeding apparatus according to claim 1, wherein the controller is configured to control the display to display the sheet type selection window indicating sheet type candidates in an order determined based on the reference attribute values only for the sheet types stored in the storage unit and the measurement results.

17. The sheet feeding apparatus according to claim 1, wherein the controller is configured to obtain reference attribute values only for the sheet types stored in the storage unit.

18. The information processing method according to claim 9, wherein in the controlling, the display displays the sheet type selection window indicating sheet type candidates in an order determined based on the reference attribute values only for the sheet types stored in the storage unit and the measurement results.

19. The information processing method according to claim 9, wherein in the obtaining reference attribute values, reference attribute values only for the sheet types stored in the storage unit are obtained.

20. The sheet feeding apparatus according to claim 1, wherein the controller is configured to determine whether or not the sheet types which were selected on the sheet type selection window in the past are stored in the storage unit, and when it is determined that the sheet types which were selected on the sheet type selection window in the past are not stored in the storage unit, obtaining reference attribute values, selecting sheet type candidates, and controlling the display are not performed.

21. The sheet feeding apparatus according to claim 1, wherein the attribute values include two or more from among specular reflection, diffuse reflection, and thickness of the sheet.

22. The information processing method according to claim 9, wherein the attribute values include two or more from among specular reflection, diffuse reflection, and thickness of the sheet.

23. The medium according to claim 14 wherein the attribute values include two or more from among specular reflection, diffuse reflection, and thickness of the sheet.

24. The sheet feeding apparatus according to claim 15, wherein the attribute values include two or more from among specular reflection, diffuse reflection, and thickness of the sheet.

* * * * *